(12) United States Patent
Jeong et al.

(10) Patent No.: US 10,553,024 B2
(45) Date of Patent: Feb. 4, 2020

(54) TILE-BASED RENDERING METHOD AND APPARATUS

(71) Applicant: SAMSUNG ELECTRONICS CO., LTD., Suwon-si, Gyeonggi-Do (KR)

(72) Inventors: Min-Kyu Jeong, Yongin-si (KR);
Jae-Don Lee, Yongin-si (KR);
Sang-Won Ha, Seongnam-si (KR);
Min-Young Son, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 47 days.

(21) Appl. No.: 15/604,774

(22) Filed: May 25, 2017

(65) Prior Publication Data

US 2018/0137677 A1 May 17, 2018

(30) Foreign Application Priority Data

Nov. 17, 2016 (KR) .................. 10-2016-0153318

(51) Int. Cl.
*G06T 17/20* (2006.01)
*G06T 11/40* (2006.01)
*G06T 15/00* (2011.01)

(52) U.S. Cl.
CPC .............. *G06T 17/20* (2013.01); *G06T 11/40* (2013.01); *G06T 15/005* (2013.01)

(58) Field of Classification Search
CPC ....... G06T 17/20; G06T 11/40; G06T 15/005; G06T 15/405; G06T 1/20; G06T 15/40; G06T 1/60; G06T 15/00; G06T 2207/20021; G06T 11/20; G06T 7/70
See application file for complete search history.

(56) References Cited

U.S. PATENT DOCUMENTS

| | | | |
|---|---|---|---|
| 6,323,860 B1 * | 11/2001 | Zhu | G06T 15/005 345/427 |
| 7,215,679 B2 | 5/2007 | Pugel | |
| 7,847,802 B1 | 12/2010 | Bittel et al. | |
| 8,045,824 B2 | 10/2011 | Kwon et al. | |
| 8,331,663 B2 | 12/2012 | Subramaniam | |
| 8,774,535 B2 | 7/2014 | Van Hook et al. | |
| 8,933,943 B2 | 1/2015 | Soupikov et al. | |
| 8,982,136 B2 | 3/2015 | Ribble et al. | |
| 9,105,131 B2 | 8/2015 | Howson | |
| 9,269,123 B2 | 2/2016 | Schneider | |
| 2011/0317891 A1 * | 12/2011 | Kajimoto | G06F 17/3028 382/128 |

(Continued)

*Primary Examiner* — Saptarshi Mazumder
(74) *Attorney, Agent, or Firm* — F. Chau & Associates, LLC

(57) ABSTRACT

A tile-based rendering method includes receiving a drawcall, determining a location of primitives in a frame based on the drawcall, dividing the frame into a plurality of tiles, and rendering the tiles, wherein the rendering includes determining a rendering order of the tiles based on primitives included in the tiles, and rendering the tiles according to the rendering order. A graphics processing unit (GPU) is configured to perform the tile-based rendering method, and may include a memory, a processor including at least one core and at least one cache. The GPU may execute a tile-based graphics pipeline for tile-based rendering of images, and allocate tiles including identical primitives to a core.

18 Claims, 10 Drawing Sheets

(56) References Cited

U.S. PATENT DOCUMENTS

| | | | |
|---|---|---|---|
| 2012/0320069 A1* | 12/2012 | Lee | G06F 9/505 |
| | | | 345/505 |
| 2013/0254727 A1* | 9/2013 | Fang | G06F 17/5081 |
| | | | 716/102 |
| 2014/0267259 A1 | 9/2014 | Frascati et al. | |
| 2015/0022525 A1* | 1/2015 | Grenfell | G06T 15/005 |
| | | | 345/427 |
| 2015/0228049 A1* | 8/2015 | Yang | G06T 1/20 |
| | | | 345/501 |
| 2015/0348306 A1 | 12/2015 | Yang et al. | |
| 2015/0379671 A1 | 12/2015 | Brothers et al. | |
| 2016/0101356 A1* | 4/2016 | Kuo | H04N 21/4781 |
| | | | 345/420 |
| 2016/0110837 A1* | 4/2016 | Sideris | G06T 11/40 |
| | | | 345/522 |
| 2016/0148424 A1 | 5/2016 | Chung et al. | |
| 2016/0292812 A1* | 10/2016 | Wu | G06T 1/20 |

* cited by examiner

| Tile | Primitive | Primitive ID: 0 | 1 | 2 | 3 |
|---|---|---|---|---|---|
| A |  | 1 | 1 | 0 | 0 |
| B |  | 1 | 1 | 0 | 0 |
| C | | 0 | 0 | 0 | 0 |
| D |  | 0 | 0 | 1 | 1 |
| E |  | 0 | 0 | 1 | 0 |
| F |  | 1 | 0 | 0 | 0 |
| G |  | 1 | 0 | 0 | 1 |
| H |  | 0 | 0 | 0 | 1 |
| I |  | 0 | 0 | 1 | 1 |
| J |  | 0 | 0 | 0 | 1 |

<AND OPERATION ON BITSTREAM OF TILE_A AND BITSTREAMS OF OTHER TILES>

|  | B | C | D | E | F | G | H | I | J |
|---|---|---|---|---|---|---|---|---|---|
| Bitstream | 1100 | 0000 | 0000 | 0000 | 1000 | 1000 | 0000 | 0000 | 0000 |
| THE NUMBER OF COMMON PRIMITIVES | 2 | 0 | 0 | 0 | 1 | 1 | 0 | 0 | 0 |

Scheduling : A → B → F → G
(TILE_C IS OMITTED BECAUSE IT DOES NOT INCLUDE ANY PRIMITIVES)

<AND OPERATION ON BITSTREAM OF TILE_D AND BITSTREAMS OF OTHER TILES>

|  | A | B | C | E | F | G | H | I | J |
|---|---|---|---|---|---|---|---|---|---|
| Bitstream | 0000 | 0000 | 0000 | 0010 | 0000 | 0001 | 0001 | 0011 | 0001 |
| THE NUMBER OF COMMON PRIMITIVES | 0 | 0 | 0 | 1 | 0 | 1 | 1 | 2 | 1 |

Scheduling : D → I → E → H → J

TILE-BASED RENDERING METHOD AND APPARATUS

CROSS-REFERENCE TO RELATED APPLICATION

This application claims the benefit of Korean Patent Application No. 10-2016-0153318, filed on Nov. 17, 2016, in the Korean Intellectual Property Office, the disclosure of which is incorporated by reference herein.

1. TECHNICAL FIELD

The present disclosure relates to a tile-based rendering method and apparatus.

2. DISCUSSION OF THE RELATED ART 3D graphics application program interface (API) standards include open graphics library (OpenGL®), OpenGL® for embedded systems (ES), Vulkan® by Khronos, or Direct 3D® by Microsoft. API standards include a method of performing rendering for each frame and displaying an image. However, many operations are performed when a frame is rendered. The rendering process also consumes a significant amount of power. Therefore, it would be desirable to reduce the amount of computations and the number of accesses to a memory when performing rendering.

SUMMARY

The inventive concept provides tile-based rendering methods and apparatuses.

In an embodiment of the inventive concept, a non-transitory computer-readable recording medium stores a program that when executed by a computer performs a method according to the inventive concept.

Additional teachings of the inventive concept will be set forth in part in the description which follows and, in part, will be apparent to a person of ordinary skill in the art from the description, or may be learned by practice of the presented example embodiments.

According to an embodiment of the inventive concept, a tile-based rendering method may include receiving a drawcall including rendering information; determining a location of primitives in a frame based on the drawcall; dividing the frame into a plurality of tiles; and rendering the plurality of tiles, wherein the rendering comprises determining a rendering order of each tile of the plurality of tiles based on whether at least a portion of one or more primitives are included in one or more of the tiles, and rendering each of the plurality tiles according to the determined rendering order.

According to an embodiment of the inventive concept the number of primitives commonly included in two or more of the plurality of tiles may be determined by generating a bitstream representing primitives included in a first tile and performing an AND operation on bitstreams of different tiles to confirm the number of primitives commonly included in first tile and the different tiles.

According to an embodiment of the inventive concept, a graphics processing unit (GPU) may include a memory, and a processor including at least one core and at least one cache, wherein the processor is configured to determine a location of primitives in a frame based on a drawcall, divide the frame into a plurality of tiles, determine a rendering order of the tiles based on a portion of one or more of the primitives being included in the tiles, and render the tiles according to the rendering order.

According to an embodiment of the inventive concept, a computing device includes a graphics processing unit (GPU) includes a processor including a least a first core and a second core, a first primary cache connected to the first core, a second primary cache connected to a second core, a secondary cache connected to the first primary cache and to the second primary cache via an internal bus of the GPU. A central processing unit (CPU) provides a drawcall to the GPU; a system bus connects the GPU, the CPU, a memory, and a display. In response to receiving a drawcall from the CPU, the GPU is configured to determine a location of primitives based on the drawcall, divide the frame into a plurality of tiles, render the tiles in a rendering order based on the primitives, and provide the rendered tiles to a frame buffer for display.

The display device may be configured to display images stored in the frame buffer.

The GPU may be configured to execute a graphics pipeline.

The graphics pipeline may be a 3D graphics pipeline configured to render 3D objects on a 3D image as a 2D image for display by the display device.

The GPU may execute a tile-based graphics pipeline for tile-based rendering (TBR).

BRIEF DESCRIPTION OF THE DRAWINGS

These and/or other teachings of the inventive concept will become more readily appreciated from the following description of the embodiments, taken in conjunction with the accompanying drawings in which.

DETAILED DESCRIPTION

Figure 1:
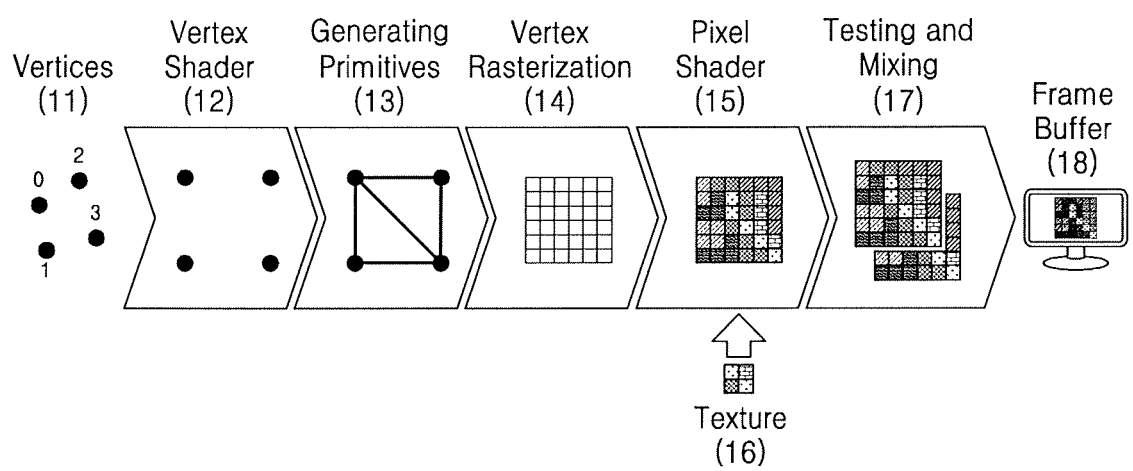
FIG. 1 is a view of a process of processing a 3D image.

Reference will now be made in detail to at least one embodiment of the inventive concept, examples of which are illustrated in the accompanying drawings, wherein like reference numerals refer to like elements throughout. In this regard, the present embodiment(s) may have different forms and should not be construed as being limited to the descriptions set forth herein. Accordingly, the embodiment(s) will be explained herein below with reference to the figures.

FIG. 1 is an overview of a process of processing a 3D image. FIG. 1 shows a process of processing a 3D image through operations 11 through 17. Operations 11 through 13 are geometry processing operations, and operations 14 to 17 are pixel processing operations.

Operation 11 is an operation of generating vertices representing an image. Vertices are generated to represent objects included in the image.

Operation 12 is an operation of shading the generated vertices. The vertex shader may perform shading on the vertices by specifying a color of the vertices generated in operation 11.

Operation 13 is an operation of generating primitives. A primitive indicates a polygon formed of points, lines, or vertices. As an example, primitives may indicate triangles formed by connecting vertices.

Operation 14 is an operation of rasterizing the primitives. Rasterizing a primitive indicates dividing a primitive into a plurality of fragments. A fragment is a unit constituting a primitive, and may be a basic unit for performing image processing. The primitive includes only information about vertices. Thus, in the rasterizing operation, interpolation may be performed when generating fragments between vertices.

Operation 15 is an operation of shading a pixel, but may be an operation of shading a fragment. Although FIG. 1 shows that shading is performed in units of pixels, shading may be performed in units of fragments. For example, shading a pixel or a fragment may include specifying a color of the pixel or fragment.

Operation 16 is an operation of texturing a pixel or fragment. Texturing is a method of using a pre-generated image to specify a color of a pixel or fragment. For example, while shading may be performed by calculating what color to assign to a fragment, texturing is a method of specifying the same color as the color of a pre-generated image in a fragment corresponding to the pre-generated image.

In operation 15 or 16, many computations are used to shade or texture each pixel or fragment. Therefore, it would be desirable if the shading or texturing process may be performed more efficiently to reduce the amount of computations. A typical method of reducing the amount of computations in the shading process is a hidden surface removal method (HSR). The HSR is a method in which an object hidden by a preceding object does not perform shading.

Operation 17 is an operation of testing and mixing.

Operation 18 is an operation of displaying a frame stored in a frame buffer. The frame generated through operations 11 through 17 is stored in the frame buffer. The frame stored in the frame buffer is displayed on a display device.

Figure 2:
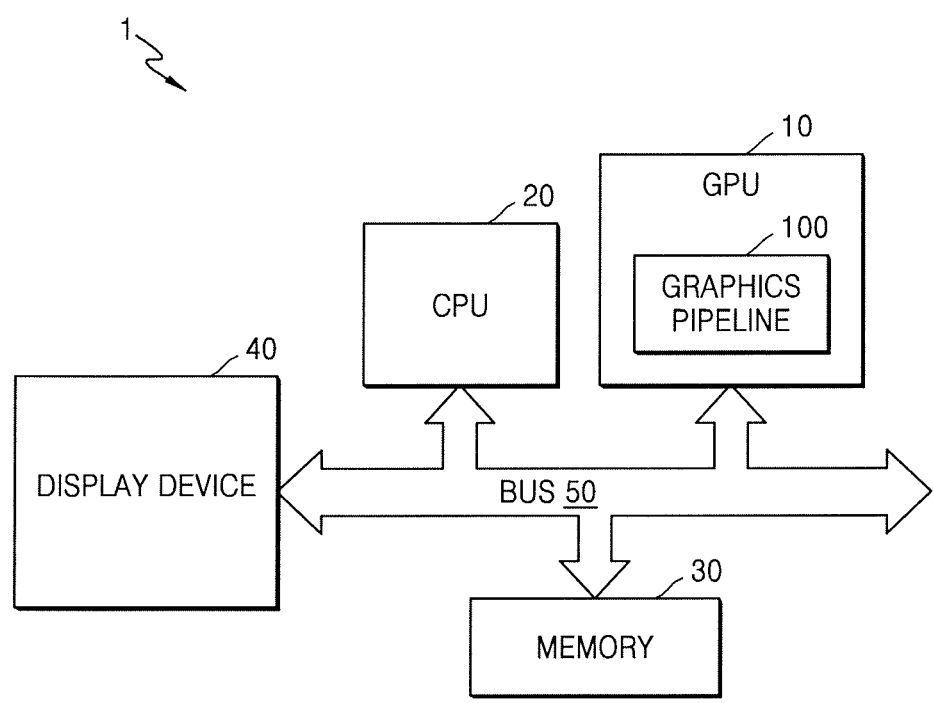
FIG. 2 is a view of a computing device according to an exemplary embodiment of the inventive concept.

FIG. 2 is a view of a computing device according to an example embodiment of the inventive concept.

Referring now to FIG. 2, a computing device 1 may include a GPU 10, a central processing unit (CPU) 20, a memory 30, a display device 40, and a bus 50. The computing device 1 of FIG. 2 shows only elements related to example embodiments of the inventive concept. Accordingly, a person of ordinary skill in the art should understand and appreciate that other general-purpose elements may further be included in addition to the elements shown in FIG. 2.

Examples of the computing device 1 include, but are not limited to, a desktop computer, a notebook computer, a smartphone, a personal digital assistant (PDA), a mobile media player, a video game console, a television set-top box, a tablet device, an e-book reader, a wearable device, a head mounted display (HMD) device, etc. For example, various devices may be further included in the computing device 1, which has a graphics processing function for displaying content.

The CPU 20 may include hardware configured to control all operations and functions of the computing device 1. For example, the CPU 20 may drive an operating system (OS), call a graphics application programming interface (API) for the GPU 10, and execute a driver of the GPU 10. Also, the CPU 20 may execute various applications stored in the memory 30, such as a web-browsing application, a game application, and a video application, just to name a few possibilities.

Furthermore, the CPU 20 may execute a compiler stored in the memory 30. The compiler may convert instructions received from an application or the like into instructions (e.g. machine code) that can be executed by the GPU 10. The compiler outputs the instructions to the GPU 10. The compiler may generate, for example, an instruction mask for each instruction. An instruction mask indicates a component that is affected by an instruction. The generated instruction mask is output to the GPU 10. The instruction mask may be generated by the CPU 20, the compiler, the GPU 10, the rasterizer, or the like. The rasterizer may be implemented in hardware that performs a fixed function.

The GPU 10 is a chip that is constructed to perform rapid calculations primarily to render images, and the GPU 10 perform pipelining via a graphics pipeline 100, and may correspond to a graphics-dedicated processor. For example, the GPU 10 may be hardware implemented to execute a 3D graphics pipeline to render 3D objects on a 3D image as a 2D image for display. More particularly, the GPU 10 may perform various graphic-related functions, such as shading, blending, and illuminating, and may perform various functions for generating pixel values of pixels to be displayed. The GPU 10 may also execute a tile-based graphics pipeline for tile-based rendering (TBR).

The GPU 10 may include at least one processor. The processor may perform different operations depending on a program. In addition, the GPU 10 may further include hardware to perform a specified operation. The GPU 10 may include a rasterizer, a shader, and the like. The GPU may include multiple cores that are capable of processing a plurality of threads simultaneously.

With continued reference to FIG. 2, the graphics pipeline 100 processed by the GPU 10 may correspond to a graphics pipeline defined by a graphics API such as various versions of DirectX, an OpenGL application program interface (API), and the like. For example, the graphics pipeline 100 according to the present exemplary embodiment is not limited to any version or any API type, and may be applied to various APIs.

The memory 30 comprises, for example, non-transitory storage that may stores various types of data processed in the computing device 1, and may store data processed or to be processed (e.g. buffered data) by the GPU 10 and the CPU 20. Also, the memory 30 may store applications and drivers that may be driven by the GPU 10 and the CPU 20. The memory 30 may include, for example, random access memory (RAM), such as dynamic random access memory (DRAM) or static random access memory (SRAM), read-only memory (ROM), electrically erasable programmable read-only memory (EEPROM), a CD-ROM, a Blu-ray or another optical disk storage device, a hard disk drive (HDD), a solid state drive (SSD), or a flash memory, and moreover, the memory 30 may include an external storage device accessible by the computing device 1.

The memory 30 may include, for example, a frame buffer and the frame buffer may store an image to be output to the display device 40.

The display device 40 comprises hardware that may display images processed by the GPU 10. The display device 40 has screen pixels of a predetermined resolution, and the GPU 10 renders an image corresponding to the resolution. The display device 40 may be implemented by various types of display panels such as an LCD, an OLED, and the like. For example, the display device 40 may be a PenTile display device, which has a structure that was designed in consideration of a biomimicry of a human retina. One pixel of the PenTile display device may include only some of all components. As an example, all components may be R, G, B, and A. R is a red component (or red channel), G is a green component (or green channel), B is a blue component (or blue channel), and A is an alpha component (or alpha channel). R, G, and B indicate colors, and A indicates transparency. For example, a first pixel of a PenTile display device may include a red component and a green component, and a second pixel may include a green component and a blue component. Depth components may also be included in all components. However, a person of ordinary skill in the art should understand that the display device 40 is not limited to a PenTile-type display device.

With continued reference to FIG. 2, the bus 50 connects other hardware components in the computing device 1 such that the other components may send or receive data to or from each other, and examples of the bus 50 include a peripheral component interconnect (PCI) bus and a PCI express bus.

Figure 3:
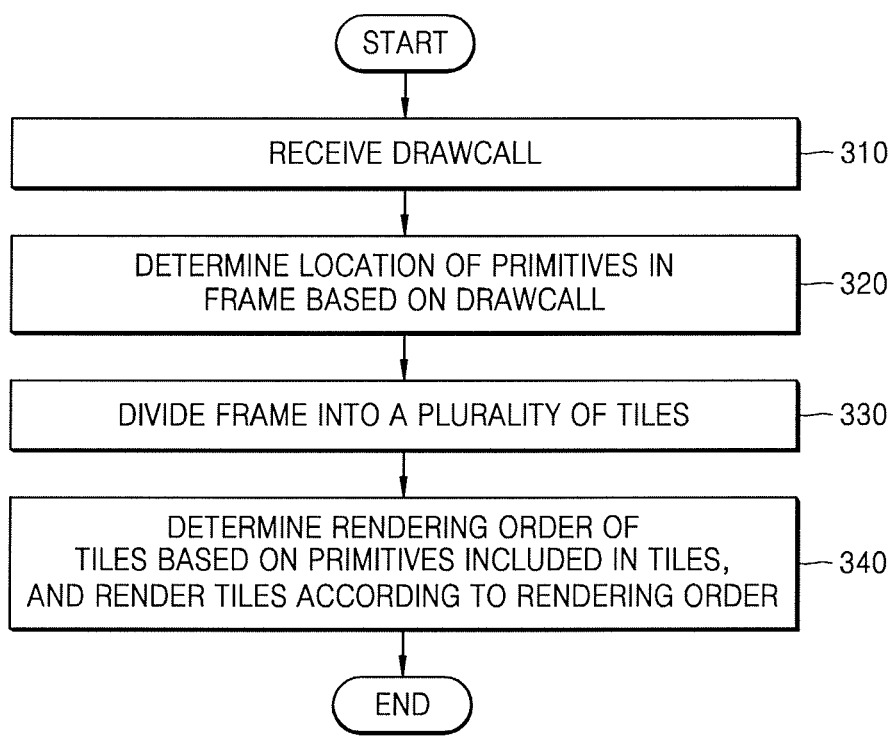
FIG. 3 is flowchart illustrating a rendering method according to an exemplary embodiment of the inventive concept.

FIG. 3 is flowchart illustrating a rendering method according to an exemplary embodiment of the inventive concept. Referring to FIG. 3, the GPU 10 may determine a rendering order based on primitives included in tiles and render the tiles according to the rendering order.

In operation 310, the GPU 10 receives a drawcall from the CPU 20. The drawcall includes information for the GPU 10 to render a frame. In other words, the GPU 10 renders the frame according to the drawcall.

In operation 320, the GPU 10 determines a location of the primitives in the frame based on the drawcall. It should be understood by a person of ordinary skill in the art that a plurality of primitives may be included in one frame.

In operation 330, the GPU 10 divides the frame into a plurality of tiles (e.g. a tiling operation). A tile is a sub-unit of the frame that the GPU 10 renders.

In operation 340, the GPU 10 determines a rendering order of the tiles based on the primitives included in the tiles, and renders the tiles according to the rendering order. The GPU 10 determines the number of primitives commonly included in the tiles and determines the rendering order of tiles based on the number of primitives. The rendering order of the tiles may be based on a quantity (number) of common primitives, which may require less computations than rendering tiles without (or a lesser quantity of) common primitives. For example, the GPU 10 determines the number of primitives commonly included in two tiles, and preferentially renders a tile having a larger number of common primitives.

One way that the GPU may determine if there are common primitives and the quantity is the GPU 10 generating a bitstream representing primitives included in a tile and perform an AND operation on bitstreams of different tiles. For example, the output of the AND operation of the bitstreams may be counted to confirm the number of primitives commonly included in the different tiles. If a first tile and a second tile commonly include two primitives and the first tile and a third tile commonly include three primitives, the GPU 10 may render the first tile, the third tile, and the second tile in this order. A person of ordinary skill in the art should understand and appreciate that in an embodiment of the inventive concept, the term "common" as applied to primitives may be understood as at least a same primitive being included in two or more tiles, but there may be other primitives included in only one or some of the two or more tiles. For example, three tiles may have a common primitive (e.g. primitive "a") and one of the three tiles may have a primitive (e.g. primitive "b") that is not included in the other two tiles. In addition, a person of ordinary skill in the art should understand that while there is a discussion above regarding the bitstreams being counted after an AND operation, it is within the inventive concept that gates that provide an equivalent logic may be used.

In an alternative to rendering tiles based on some of the tiles having common primitives, the GPU 10 may successively render tiles including identical primitives from among a larger group of the tiles. For example, if a first tile, a second tile, a seventh tile, and an eighth tile include identical primitives, the GPU 10 may successively render the first tile, the second tile, the seventh tile, and the eighth tile.

The GPU 10 may allocate tiles including identical primitives among the tiles to an identical (e.g. a same) core. For example, if a first tile, a second tile, a seventh tile, and an eighth tile include identical primitives, the GPU 10 may allocate all of the first tile, the second tile, the seventh tile, and the eighth tile to a first core. The first core renders the allocated tiles.

The GPU 10 may allocate tiles including identical primitives from among a plurality of the tiles to a plurality of cores sharing an identical cache. For example, if first and second tiles include identical primitives, and the first and second cores share an identical cache, the GPU 10 may allocate the first tile to the first core, and the second tile to the second core. By the first and second cores sharing an identical cache, which may be a level 1 (L1) cache, both the first and second cores may use data stored in the L1 cache.

Figure 4:
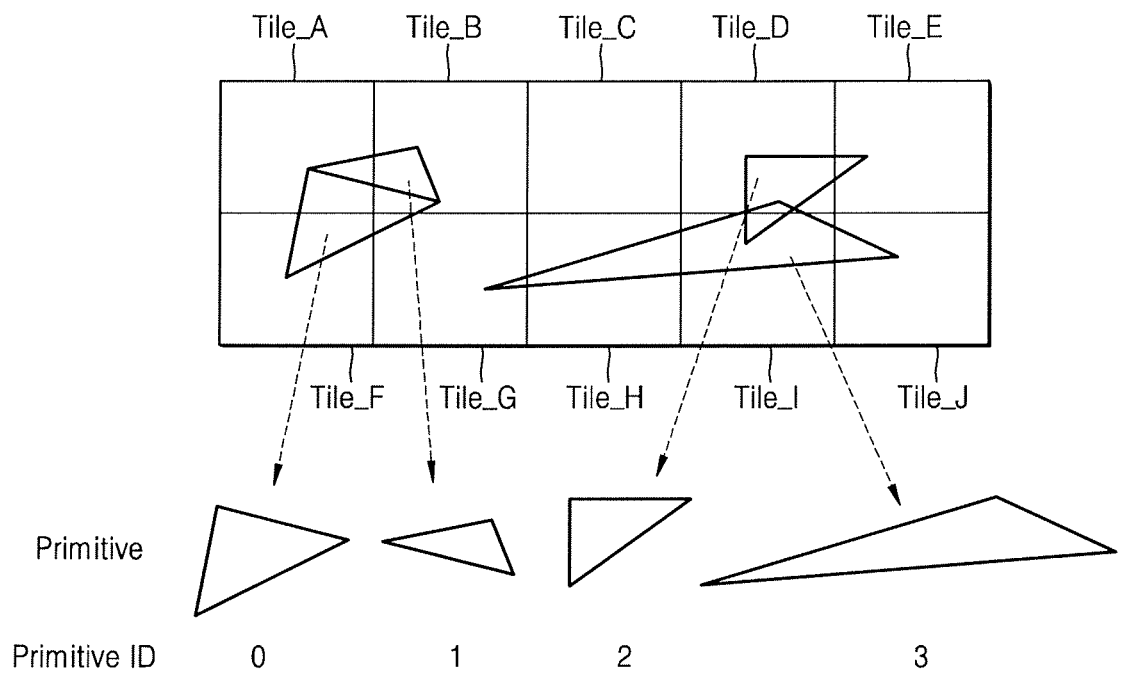
FIG. 4 is a view illustrating a tile-based rendering method of the inventive concept.

FIG. 4 is a view illustrating a tile-based rendering method. Referring to FIG. 4, a frame 400 is divided into 10 tiles Tile_A, Tile_B, Tile_C, Tile_D, Tile_E, Tile_F, Tile_G, Tile_H, Tile_I, Tile_J. The frame 400 includes four primitives with primitive IDs 0 through 3. A person of ordinary skill in the art should understand and appreciate that the number of tiles in this example (ten) has been provided for illustrative purposes only and this example does not in any way limit the subdivision of a frame into a specific quantity or range of tiles. In the inventive concept, there can be more tiles or fewer tiles than ten tiles shown in the example of FIG. 4. The GPU 10 may successively process tiles including identical primitives. Successively processing tiles including identical primitives may include, for example, processing the other tiles after processing the tiles including identical primitives. For example, the GPU 10 may successively process Tile_A and Tile_F. Tile_A and Tile_F include a primitive with primitive ID 0, and thus are tiles including identical primitives. Thus, the GPU 10 may process Tile_F before processing Tile_C and Tile_D after processing Tile_A.

The GPU 10 may process tiles in the order of Tiles A, B, F, G, H, I, J, D, and E. After processing Tile_A, the GPU 10 processes the tiles Tile_B, Tile_F, and Tile_G including the same primitives as primitives with primitive IDs 0 and 1 included in Tile_A. The GPU 10 processes Tile_G and then processes the tiles Tile_G, Tile_H, Tile_I, and Tile_J including a primitive with a primitive ID 3 included in Tile_G. The GPU 10 processes the tiles Tile_D and Tile_E including the same primitives as primitives with primitive IDs 2 and 3 included in Tile_I.

Alternatively, the GPU 10 may process tiles including identical primitives in cores sharing an identical cache. For example, there are first to fourth cores sharing a first cache, and fifth to eighth cores sharing a second cache. When the tiles Tile_A, Tile_B, Tile_F, and Tile_G share the primitives with primitive IDs 0 and 1, the GPU 10 may allocate the tiles Tile_A, Tile_B, Tile_F, and Tile_G to the first to fourth cores. Thus, the first to fourth cores render the tiles Tile_A, Tile_B, Tile_F, and Tile_G. Since the first cache stores data for the tiles Tile_A, Tile_B, Tile_F and Tile_G, the first to fourth cores may render the tiles Tile_A, Tile_B, Tile_F, and Tile_G using data stored in the first cache. Cores that share an identical cache may render tiles including identical primitives, thereby increasing a cache hit ratio as there is a greater likelihood that a subsequent memory block will be reread.

Figure 5:
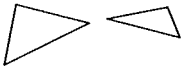
FIG. 5 is a view of a bitstream indicating primitives included in each tile.
Figure 5:
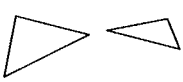
Figure 5:
Figure 5:
Figure 5:
Figure 5:
Figure 5:
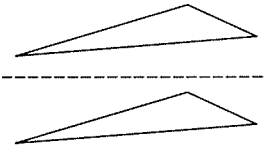
Figure 5:
Figure 5:
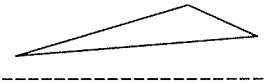

FIG. 5 is a view of a bitstream indicating primitives included in each tile. Referring to FIG. 5, the GPU 10 may represent primitives included in each tile as a bitstream. FIG. 5 shows a bitstream for the tiles included in the frame 400 of FIG. 4.

Since Tile_A includes two primitives with primitive IDs 0 and 1, the GPU 10 generates bitstream 1100 for Tile_A. Since Tile_B also includes the two primitives with primitive IDs 0 and 1 in the same manner as Tile_A, the GPU 10 generates bitstream 1100 for Tile_B. Since Tile_C does not include any primitives, the GPU 10 generates bitstream 0000 for Tile_C. Since Tile_D includes two primitives with primitive IDs 2 and 3, the GPU 10 generates bitstream 0011 for Tile_D. Bitstreams for the other tiles are also generated in the same way.

The GPU 10 may determine a schedule of tiles using the generated bitstreams. For example, the GPU 10 may perform an AND operation on two bitstreams to identify primitives shared by tiles.

Figure 6:
FIG. 6 is a view illustrating a method of determining a schedule of tiles according to the inventive concept.

FIG. 6 is a view illustrating a method of determining a schedule of tiles according to an embodiment of the inventive concept. FIG. 6 shows determination of a schedule of tiles using a result of performing an AND operation on a bitstream of Tile_A and bitstreams of other tiles.

A bitstream of Tile_A is 1100. Bitstreams of the other tiles are shown in FIG. 5. Bitstreams in the table of FIG. 6 show the result of performing the AND operation on the bitstream of Tile_A and the bitstreams of other tiles. For example, since a bitstream of Tile_A is 1100 and a bitstream of Tile_B is 1100, if an AND operation is performed on the bitstream 1100 of Tile_A and the bitstream 1100 of Tile_B, 1100 is obtained as the result. Since a bitstream of Tile_D is 0011, if an AND operation is performed on the bitstream 1100 of Tile_A and the bitstream 0011 of Tile_D, 0000 is obtained as the result.

The GPU 10 may confirm the number of common primitives according to the number of 1s included in a bitstream generated by an AND operation. For example, since the bitstream obtained by performing an AND operation on the bitstream 1100 of Tile_A and the bitstream 1100 of Tile_B are 1100 and the bitstream 1100 includes two 1s, Tile_A and Tile_B include two primitives in common.

The GPU 10 determines a schedule of tiles according to the number of common primitives. In FIG. 6, Tile_B sharing the largest number of primitives with Tile_A is processed after Tile_A, and Tile_F and Tile_G are processed after Tile_B as they each include one primitive in common.

Figure 7:
FIG. 7 is a view illustrating a method of determining a schedule of tiles according to the inventive concept.

FIG. 7 is a view illustrating a method of determining a schedule of tiles. FIG. 7 shows determination of a schedule of tiles using a result of performing an AND operation on a bitstream of Tile_D and bitstreams of other tiles in this example in conjunction with FIG. 5.

For example, FIG. 5 shows that a bitstream of Tile_D is 0011. Bitstreams of the other tiles are also shown in FIG. 5. Bitstreams in the table of FIG. 7 show the result of performing the AND operation on the bitstream of Tile_D and the bitstreams of other tiles. For example, since a bitstream of Tile_D is 0011 and a bitstream of Tile_E is 0010, if an AND operation is performed on the bitstream 0011 of Tile_D and the bitstream 0010 of Tile_E, 0010 is obtained as the result. Since a bitstream of Tile_G is 1001, if an AND operation is performed on the bitstream 1001 of Tile_G and the bitstream 0011 of Tile_D, 0001 is obtained as the result.

The GPU 10 may confirm the number of common primitives according to the number of 1s included in a bitstream generated by an AND operation. For example, since the bitstream obtained by performing an AND operation on the bitstream 0011 of Tile_D and the bitstream 0010 of Tile_E is 0010, and the bitstream 0010 includes one 1, Tile_D and Tile_E commonly include one primitive.

The GPU 10 determines a schedule of tiles according to the number of common primitives. In FIG. 7, Tile_I sharing the largest number of primitives with Tile_D is processed after Tile_D, and then Tile_E, Tile_H and Tile_J are processed after Tile_I.

The GPU 10 may determine a processing order of the tiles Tile_A through Tile_J based on the results of FIGS. 6 and 7. The GPU 10 may process tiles in the order of Tile_A, Tile_B, Tile_F, Tile_G, Tile_D, Tile_I, Tile_E, Tile_H, and Tile_J. Tile_C is omitted from the processing order because it does not include any primitives.

Figure 8:
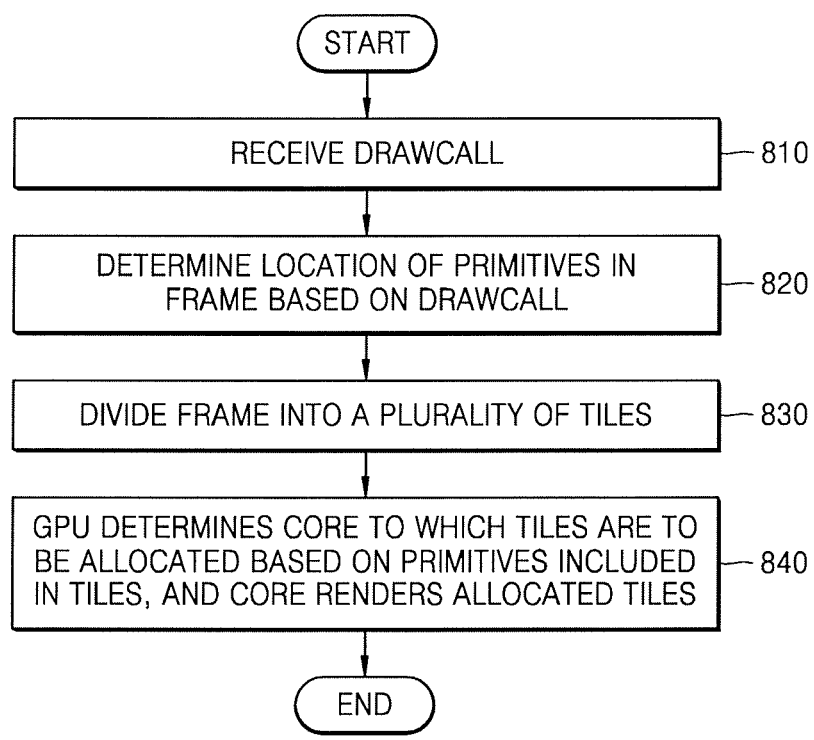
FIG. 8 is flowchart illustrating a rendering method according to an exemplary embodiment of the inventive concept.

FIG. 8 is flowchart illustrating a rendering method according to an exemplary embodiment of the inventive concept. Referring to FIG. 8, the GPU 10 may determine which core to render tiles based on primitives included in the tiles.

In operation 810, the GPU 10 receives a drawcall from the CPU 20. The drawcall includes information for the GPU 10 to render a frame. In other words, the GPU 10 renders the frame for display based on processing the information according to the drawcall.

In operation 820, the GPU 10 determines a location of the primitives in the frame based on the drawcall. A plurality of primitives may be included in one frame.

In operation 830, the GPU 10 divides the frame into a plurality of tiles. A tile is a unit that the GPU 10 renders. FIG. 4 shows one non-limiting example of a frame being divided into ten tiles. An artisan should understand and appreciate that the frame may be divided into a larger quantity or a smaller quantity of tiles than shown.

In operation 840, the GPU 10 determines a core to which tiles are to be allocated based on the primitives included in the tiles, and the core renders the allocated tiles.

The GPU 10 may allocate tiles including identical primitives to one particular core. For example, if a first tile, a second tile, a seventh tile, and an eighth tile include identical primitives, the GPU 10 may allocate all of the first tile, the second tile, the seventh tile, and the eighth tile to a first core.

As another example, the GPU 10 allocates tiles including identical primitives to a plurality of cores sharing an identical cache memory. For example, if the first and second tiles include identical primitives, and first and second cores share an identical cache, the GPU 10 may allocate the first tile to the first core, and the second tile to the second core. In this example, as the first and second cores share an identical cache, it should be understood that the first and second cores may share, for example, an L1 cache, and that the first and second cores both use at least some of the data stored in the L1 cache.

Figure 9:
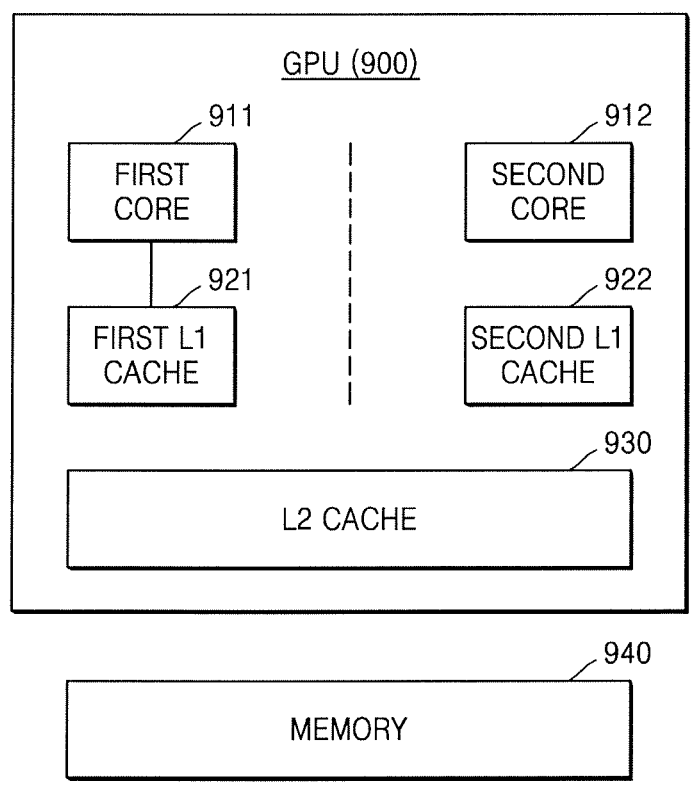
FIG. 9 is a block diagram of a graphics processing unit (GPU) according to an exemplary embodiment of the inventive concept.

FIG. 9 is a block diagram of a GPU according to an exemplary embodiment of the inventive concept. Referring to FIG. 9, a GPU 900 may allocate tiles including identical primitives to one particular core. For example, in FIG. 9, a first core 911 uses a first L1 cache 921 and a second core 912 uses a second L1 cache 922. The first core 911 does not use the second L1 cache 922.

The first core 911 may sequentially access the first L1 cache 921, an L2 cache 930, and a memory 940 according to whether data is stored or not. In other words, when the first core 911 does not find the data in the first L1 cache 921, the sequence of the search is to access L2 cache 930, followed by memory 940. The time utilized for access is longer when accessing the memory 940, which is a reason that the memory is accessed as the last storage in the sequence. The second core 912 may sequentially access the second L1 cache 922, the L2 cache 930, and the memory 940 according to whether data is stored or not.

The first core 911 confirms whether data is stored in the first L1 cache 921 when rendering tiles, and confirms whether data is stored in the L2 cache 930 is sufficient for use in rendering tiles when such data is not stored in the first L1 cache 921. The first core 911 may render tiles using data stored in the first L1 cache 921 if the data stored in the first cache 921 is sufficient for use in rendering tiles is stored in the first L1 cache 921 (cache hit). The first core 911 confirms whether there is data is stored in the memory 940 to render tiles wherein it is determined that the data is not stored in the first L1 cache 921 and the L2 cache 930.

The second core 912 confirms whether data is stored in the second L1 cache 922 when rendering tiles, and confirms whether data is stored in the L2 cache 930 is sufficient for use in rendering tiles when such data is not stored in the second L1 cache 922. The second core 912 renders tiles using data stored in the second L1 cache 922 if data sufficient for use in rendering tiles is stored in the second L1 cache 922 (cache hit). The second core 912 confirms whether data is stored in the memory 940 for use in rendering tiles if data sufficient for use in rendering tiles is not stored in the second L1 cache 922 and the L2 cache 930.

As described above, the first core 911 and the second core 912 confirm whether data is stored in the order of the first and second L1 caches 921 and 922, the L2 cache 930, and the memory 940. Since the first and second cores 911 and 912 render tiles using data stored in the first and second L1 caches 921 and 922, the L2 cache 930, the memory 940 and so on, a cache hit ratio may be increased to reduce the number of connections of the first and second cores 911 and 912 to the memory 940 and the amount of data to be read from the memory 940. Accordingly, the first and second cores 911 and 912 may successively render tiles including identical primitives, thereby increasing a cache hit ratio.

Figure 10:
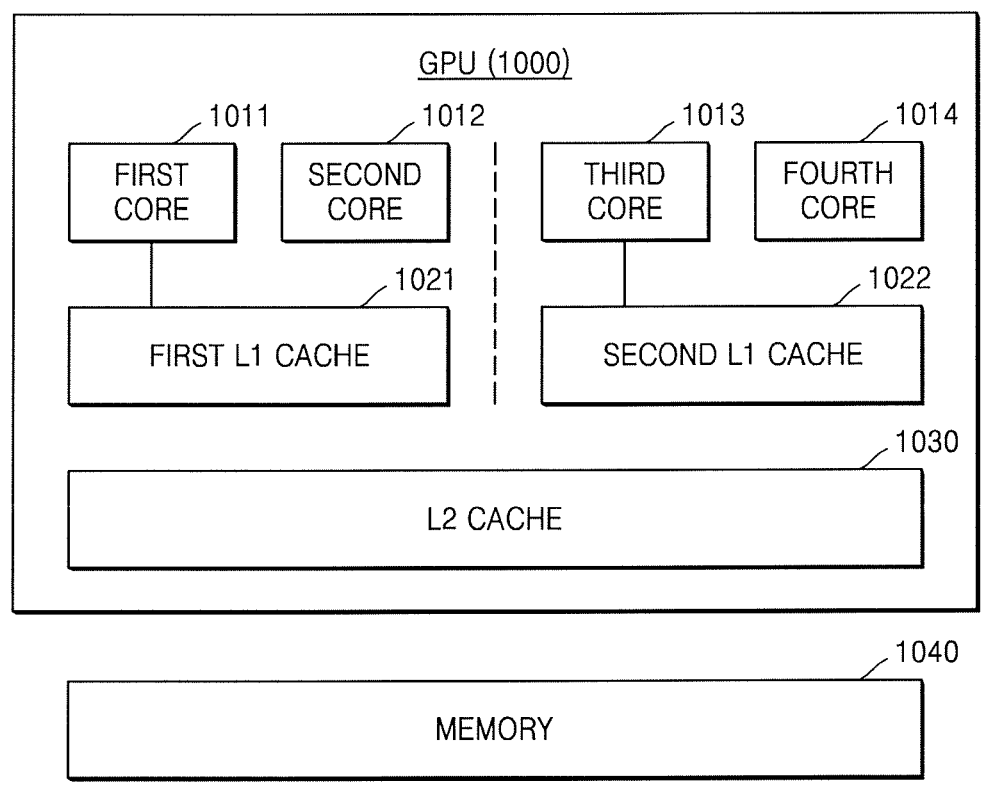
FIG. 10 is a block diagram of a GPU according to an exemplary embodiment of the inventive concept.

FIG. 10 is a block diagram of a GPU according to an exemplary embodiment of the inventive concept. Referring to FIG. 10, a first core 1011 and a second core 1012 use a first L1 cache 1021, and a third core 1013 and a fourth core 1014 use a second L1 cache 1022. In other words, the first and second cores 1011 and 1012 share the first L1 cache 1021, whereas the third core 1013 and fourth core 1014 share the second L1 cache 1022.

Although FIG. 10 shows an example in which two cores share one cache, a person of ordinary skill in the art should understand that three or more cores may share one cache, or two or more cores may share two or more caches.

A GPU 1000 shown in FIG. 10 may allocate tiles including identical primitives to a plurality of cores sharing an identical cache. For example, if a first tile and a second tile include identical primitives, the GPU 1000 may allocate the first tile to the first core 1011, and may allocate the second tile to the second core 1012. Alternatively, the GPU 1000 may allocate the first tile to the third core 1013, and the second tile to the fourth core 1014. When the first and second tiles are respectively allocated to the first and second cores 1011 and 1012, data of a primitive included in the first and second tiles is loaded into the first L1 cache 1021. Accordingly, the first and second cores 1011 and 1012 may render the first and second tiles using data loaded into the first L1 cache 1021.

The first and second cores 1011 and 1012 may be sequentially connected to the first L1 cache 1021, a L2 cache 1030, and a memory 1040. The third and fourth cores 1013 and 1014 may be sequentially connected to the second L1 cache 1022, the L2 cache 1030, and the memory 1040.

The GPU 1000 may include a processor (not shown), which may include the plurality of cores 1011 through 1014, a tile scheduler (not shown), and the plurality of caches 1021, 1022, and 1030. The tile scheduler may determine tiles to be allocated to the cores 1011 through 1014, or may determine an order of the tiles to be allocated to the cores 1011 through 1014. The tile scheduler may determine a rendering order of tiles using a bitstream indicating primitives included in the tiles. The tile scheduler may allocate tiles to the cores 1011 through 1014.

The cores 1011 through 1014 render tiles. The plurality of caches 1021, 1022, and 1030 store data used by the cores 1011 through 1014 to render tiles.

Tiles including identical primitives may be successively rendered.

Cores sharing an identical cache may render tiles including identical primitives.

As discussed above in conjunction with the drawing figures, according to the inventive concept, the rendering of tiles having identical primitives by a same core, or by two or more cores having a common cache (e.g. same cache) may reduce an amount of computations and the number of accesses to a memory when performing rendering. In addition, the successive rendering of tiles including identical primitives may increase a cache hit ratio.

The device described herein may comprise a processor, a memory for storing program data and execution, a permanent locker unit such as a disk drive, a communication port for handling communications with external devices, and user interface devices including a touch panel, keys, buttons, etc. When software modules or algorithms are involved, these software modules may be stored as program instructions or computer-readable codes executable on a processor on a computer-readable recording medium. Examples of the computer-readable recording medium include magnetic storage media (e.g., ROM, RAM, floppy disks, hard disks, etc.), and optical recording media (e.g., CD-ROMs, digital versatile disks (DVDs), etc.). The computer-readable recording medium can also be distributed over network-coupled computer systems so that the computer-readable code is stored and executed in a distributive manner. This media can be read by the computer, stored in the memory, and executed by the processor. The processor may include an integrated circuit.

The present disclosure may be illustrated by functional block formations and various processing operations. Such functional blocks may be realized by a multiple number of hardware configurations performing particular functions and/or software configurations. For example, the present disclosure may adopt IC formations such as memory, processors, logic units and look-up tables, which can perform various functions by controlling more than one microprocessor or by other control systems. Similarly to formation elements being capable of being executable by software programming or software factors, the present disclosure may be realized by programming or scripting languages such as C, C++, Java and assembler, including various algorithms realized by a combination of data structures, processes, routines or other programming formations. Functional aspects may be realized by algorithms executed in more than one processor. In addition, the present disclosure may adopt related-art technology for electronic environment set-up, signal processing, and/or data processing, etc. Terms such as "mechanism", "element", "means" and "formation" may be widely used, and not limited to mechanical and physical formations. Terms above may include meanings of series of routines of software related to a processor, etc.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a", "an", and "the" and similar referents in the context of describing the inventive concept (especially in the context of the following claims) are to be construed to cover both the singular and the plural. Furthermore, the recitation of ranges of values herein are merely intended to serve as a shorthand method of referring individually to each separate value falling within the range, unless otherwise indicated herein, and each separate value is incorporated into the specification as if it were individually recited herein. Also, the operations of all methods described herein can be performed in any suitable order unless otherwise indicated herein or otherwise clearly contradicted by context. The inventive concept is not limited to the described order of the operations. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope of the inventive concept.

It should be understood that embodiments of the inventive concept described herein should be considered in a descriptive sense only and not for purposes of limitation. Descriptions of features or aspects within each embodiment should typically be considered as available for other similar features or aspects in other embodiments.

While one or more embodiments of the inventive concept have been described with reference to the figures, it will be understood by those of ordinary skill in the art that various changes in form and details may be made therein without departing from the spirit and scope as defined by the following claims.

What is claimed is:

1. A tile-based rendering method comprising:
receiving a drawcall including rendering information;
determining a location of primitives in a frame based on the drawcall;
dividing the frame into a plurality of tiles;
determining a number of primitives commonly included in two or more of the plurality of the tiles, wherein the number of primitives commonly included in the two or more of the plurality of the tiles comprises a number of primitives that overlap each of the two or more of the plurality of tiles; and
rendering the plurality of tiles, wherein the rendering comprises determining a rendering order of each tile of the plurality of tiles based on the number of primitives commonly included in the two or more of the plurality of the tiles, and rendering each of the plurality tiles according to the determined rendering order;
wherein the determining the number of primitives commonly included in two or more of the plurality of the tiles comprising:
generating a first bitstream representing primitives included in a first tile;
performing an AND operation on the first bitstream and bitstreams of different tiles;
counting a number of 1s included in second bitstreams generated by the AND operation; and
determining the counted number of 1s as the number of primitives commonly included in two or more of the plurality of the tiles.

2. The tile-based rendering method according to claim 1, further comprising storing the rendered tiles in a frame buffer for display by a display device.

3. The tile-based rendering method of claim 1, wherein the rendering comprises successively rendering each of tiles having a larger number of common primitives from among the plurality of tiles.

4. The tile-based rendering method of claim 1, wherein the rendering comprises successively rendering each of the tiles including identical primitives from among the plurality of tiles.

5. The tile-based rendering method of claim 1, wherein the rendering comprises rendering each of the tiles including identical primitives from among the plurality of tiles by using a same core of a graphics processing unit.

6. The tile-based rendering method of claim 1, wherein the rendering comprises rendering each of the tiles including identical primitives from among the plurality of tiles by using a plurality of cores of a graphics processing unit sharing a same cache.

7. The tile-based rendering method of claim 1, using the AND operation on bitstreams of different tiles to confirm the number of primitives commonly included in first tile and the different tiles.

8. The tile-based rendering method according to claim 1, wherein rendering the plurality of tiles includes executing a graphics pipeline by a graphics processing unit (GPU) to render 3D objects in a 3D image as a 2D image for display.

9. A graphics processing unit (GPU) comprising:
a memory; and
a processor including at least one core and at least one cache, wherein the processor is configured to determine a location of primitives in a frame based on a drawcall, divide the frame into a plurality of tiles, generate a bitstream for each of the plurality of tiles where each bitstream represents which of the primitives are included in a tile, determine a number of primitives commonly included in two or more of the plurality of the tiles based on the bitstreams, wherein the number of primitives commonly included in the two or more of the plurality of the tiles comprises a number of primitives that overlap each of the two or more of the plurality of tiles, determine a rendering order of the tiles based the number of commonly included primitives, and render the tiles according to the determined rendering order;

wherein the determining the number of primitives commonly included in two or more of the plurality of the tiles comprising:

generating a first bitstream representing primitives included in a first tile;

performing an AND operation on the first bitstream and bitstreams of different tiles;

counting a number of 1s included in second bitstreams generated by the AND operation; and determining the counted number of 1s as the number of primitives commonly included in two or more of the plurality of the tiles.

10. The GPU of claim 9, wherein the processor is configured to successively render tiles having a larger number of common primitives from among the plurality of tiles.

11. The GPU of claim 9, wherein the processor is configured to successively render tiles including identical primitives from among the plurality of tiles.

12. The GPU claim 9, wherein the processor is configured to allocate tiles including identical primitives from among the plurality of tiles to a same core.

13. The GPU of claim 9, wherein the processor is configured to allocate tiles including identical primitives from among the plurality of tiles to a plurality of cores sharing a same cache.

14. A non-transitory computer-readable recording medium having recorded thereon a program for executing the method of claim 1.

15. A computing device comprising:
a graphics processing unit (GPU) including:
a processor including a least a first core and a second core;
a first primary cache connected to the first core;
a second primary cache connected to a second core;
a secondary cache connected to the first primary cache and to second primary cache via an internal bus of the GPU; a central processing unit (CPU) that provides a drawcall to the GPU;
a memory connected at least to the CPU and GPU;
a system bus that connects the GPU, the CPU, and the memory, wherein in response to receiving the drawcall from the CPU, the GPU is configured to determine a location of primitives based on the drawcall, divide a frame into a plurality of tiles, successively render each of the tiles having a larger number of common primitives or including identical primitives from among the plurality of tiles, wherein the larger number is based on each of the common primitives overlapping two or more of the plurality of tiles, and provide the rendered tiles to a frame buffer for display;
wherein the GPU is further configured to determine a number of primitives commonly included in two or more of the plurality of the tiles by:
generating a first bitstream representing primitives included in a first tile;
performing an AND operation on the first bitstream and bitstreams of different tiles;
counting a number of 1s included in second bitstreams generated by the AND operation; and
determining the counted number of 1s as the number of primitives commonly included in two or more of the plurality of the tiles.

16. The computing device of claim 15, further comprising a display device that connects to the system bus, the display device configured to display images stored in the frame buffer.

17. The computing device of claim 15, wherein the GPU is configured to execute a graphics pipeline.

18. The computing device of claim 17, wherein the graphics pipeline comprises a 3D graphics pipeline configured to render 3D objects in a 3D image as a 2D image for display by a display device.

* * * * *